(12) United States Patent
Simonen et al.

(10) Patent No.: US 12,212,888 B2
(45) Date of Patent: Jan. 28, 2025

(54) COMPUTER SYSTEM FOR PREPROCESSING VIDEO STREAM AT REQUESTED VIDEO DATA RATE PARAMETER

(71) Applicant: Microsoft Technology Licensing, LLC, Redmond, WA (US)

(72) Inventors: Mikko Henrik Simonen, Tampere (FI); Tuomas Sakari Jarvinen, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/338,142

(22) Filed: Jun. 20, 2023

(65) Prior Publication Data

US 2024/0430382 A1 Dec. 26, 2024

(51) Int. Cl.
 *H04N 7/01* (2006.01)
 *G06V 10/56* (2022.01)
 *H04N 7/15* (2006.01)

(52) U.S. Cl.
 CPC ........... *H04N 7/0117* (2013.01); *G06V 10/56* (2022.01); *H04N 7/013* (2013.01); *H04N 7/15* (2013.01)

(58) Field of Classification Search
 CPC ...... H04N 7/01; H04N 7/0117; H04N 7/0122; H04N 7/15; H04N 7/013; G06V 10/56
 USPC ........ 348/441, 443, 445, 458, 459; 345/603, 345/475, 698, 3.2, 3.3; 725/103, 64, 67, 725/68, 74, 82, 85, 91, 98, 100, 105, 114,
 (Continued)

(56) References Cited

U.S. PATENT DOCUMENTS 8,947,492 B2 2/2015 Lee et al.
11,200,635 B2 12/2021 Dahlback
(Continued)

FOREIGN PATENT DOCUMENTS

CN 113315991 A 8/2021
CN 115842899 A 3/2023
(Continued)

OTHER PUBLICATIONS

International Search Report and Written Opinion received for PCT Application No. PCT/US2024/031512, Sep. 19, 2024, 23 pages.

*Primary Examiner* — Sherrie Hsia
(74) *Attorney, Agent, or Firm* — Alleman Hall & Tuttle LLP

(57) ABSTRACT

A computing system is provided, including a camera configured to capture a series of images in a video stream, processing circuitry, and an image processing pipeline including a preprocessing module and an encoder, in which the preprocessing module is configured to receive the video stream from the camera at a camera-native video data rate parameter. The processing circuitry is configured to communicate with a server to establish a joint video communication session with remote client devices and receive a requested video data rate parameter from the server for the video stream captured by the camera. The processing circuitry is further configured to send a command to the preprocessing module to adjust the camera-native video data rate parameter of the video stream to the requested video data rate parameter and preprocess the video stream at the requested video data rate parameter and pass the preprocessed video stream to the encoder.

20 Claims, 5 Drawing Sheets

(58) Field of Classification Search
USPC ....... 725/118, 120, 131, 135, 139, 144, 148,
725/151
See application file for complete search history.

(56) References Cited

U.S. PATENT DOCUMENTS

| | | |
|---|---|---|
| 2004/0170330 A1* | 9/2004 | Fogg ..................... H04N 19/85 348/E5.062 |
| 2017/0064227 A1 | 3/2017 | Lin |
| 2018/0054596 A1 | 2/2018 | Gwock |
| 2022/0109564 A1 | 4/2022 | Currie |

FOREIGN PATENT DOCUMENTS

| | | |
|---|---|---|
| WO | 2022212319 A1 | 10/2022 |
| WO | 2023064139 A1 | 4/2023 |

* cited by examiner

TABLE

| FORMAT | RESOLUTION | MIN FRAME RATE | COLOR SPACE | DATA RATE [MBITS/SEC] | RATIO (UHD : X) |
|---|---|---|---|---|---|
| ULTRA HD (UHD/4K) | 3840 × 2160 | 30 | NV12 | 2985.984 | 1 |
| QUAD HD (QHD) | 2560 × 1440 | 30 | NV12 | 1327.104 | 2.25 |
| FULL HD | 1920 × 1080 | 30 | NV12 | 746.496 | 4 |
| HD | 1280 × 720 | 30 | NV12 | 331.776 | 9 |
| SD | 640 × 360 | 30 | NV12 | 82.994 | 36 |

FIG. 3 ously using a digital video camera and streaming video. In video conferencing, a joint video communication session with one or more remote client devices is hosted by a server where the one or more remote client devices capture the video stream from the digital video camera, encode it, and send it to the server. The server then relays the video stream to other remote client devices.

COMPUTER SYSTEM FOR PREPROCESSING VIDEO STREAM AT REQUESTED VIDEO DATA RATE PARAMETER

BACKGROUND

Video conferencing is a tool that enables people to communicate through a video-supported platform on a computer, smart device, or telecollaboration tool. It allows people at two or more locations to see and hear each other simultaneously using a digital video camera and streaming video. In video conferencing, a joint video communication session with one or more remote client devices is hosted by a server where the one or more remote client devices capture the video stream from the digital video camera, encode it, and send it to the server. The server then relays the video stream to other remote client devices.

SUMMARY

A computing system for preprocessing a video stream at a requested video data rate parameter is provided. According to one aspect, the computing system comprises a camera configured to capture a series of images in a video stream. The computing system further comprises an image processing pipeline including a preprocessing module and an encoder, in which the preprocessing module is configured to receive the video stream from the camera at a camera-native video data rate parameter and the encoder is configured to encode the video stream into one of a plurality of formats. The computing system further comprises processing circuitry coupled to a memory that stores instructions, which, upon execution by the processing circuitry, cause the processing circuitry to communicate with a server to establish a joint video communication session with one or more remote client devices. The processing circuitry is further configured to receive a requested video data rate parameter from the server for the video stream captured by the camera, and send a command to the preprocessing module to adjust the camera-native video data rate parameter of the video stream captured by the camera to the requested video data rate parameter. The preprocessing module is further configured to preprocess the video stream at the requested video data rate parameter and pass the processed video stream to the encoder. The encoder is further configured to encode the processed video stream into a specified format, maintaining the requested video data rate parameter. The processing circuitry is further configured to transmit the video stream, in the specified format, at the requested video data rate parameter to the server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows data rates required for processing various formats with different resolutions by the computing system of FIG. 1.

DETAILED DESCRIPTION

As discussed above, in a joint video session, the video stream is captured, processed, and sent via one of the remote client devices to other remote client devices through a server. The client device captures the video stream via an associated camera at a camera-native resolution (e.g., UHD) and performs an image processing on the video stream. The server or client device then prepares multiple outgoing video streams based on the specific resolutions (e.g., HD, SD) requested by other remote client devices. However, since the image processing at the client device is performed on the video stream at the camera-native resolution, which is typically higher than the requested resolutions, even though the video stream at the camera-native resolution is not requested by other remote client devices, the image processing at the client device requires extra processing power and memory, leading to excessive energy consumption.

Figure 1:
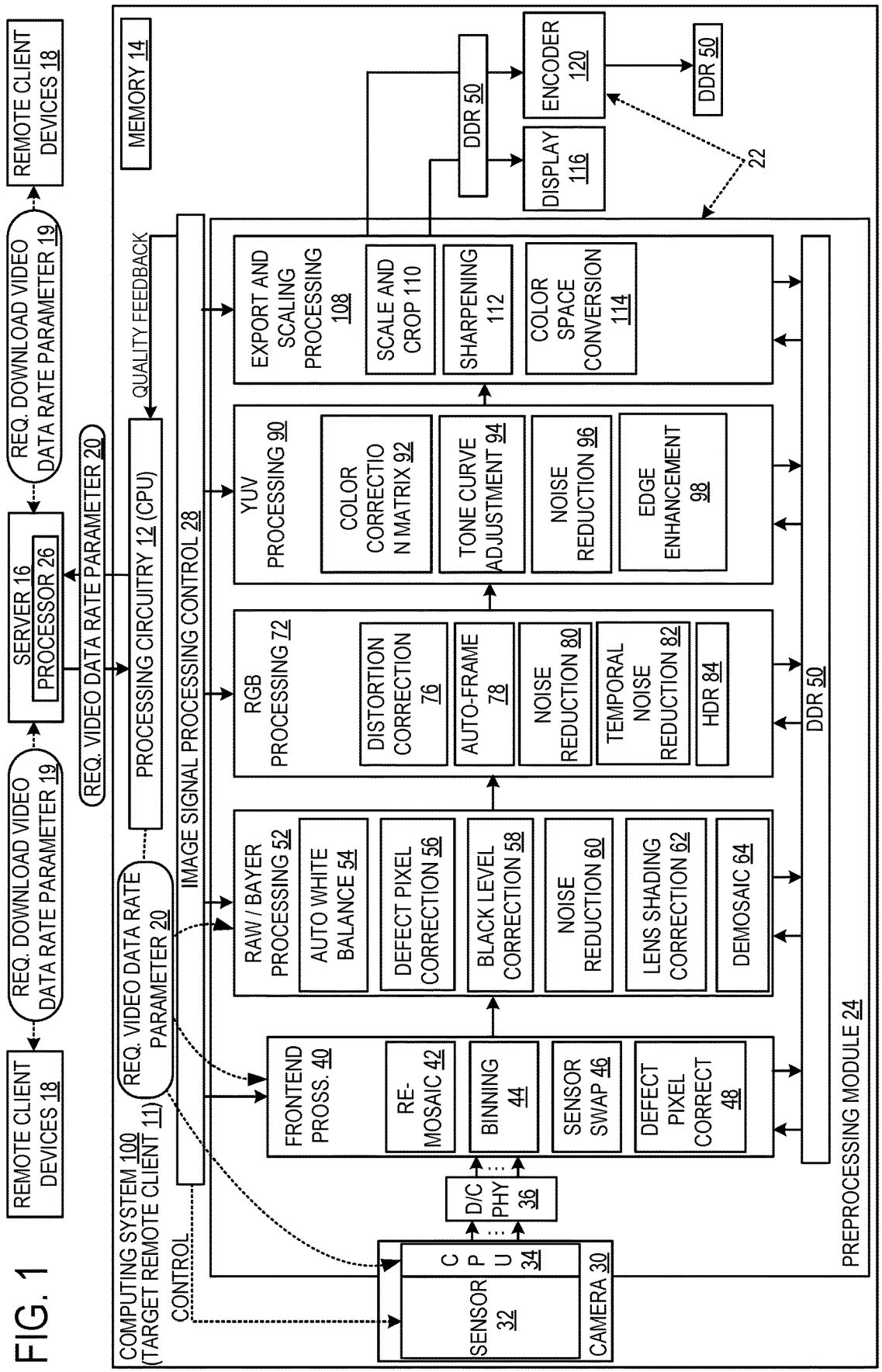
FIG. 1 shows a schematic view of an example computing system for preprocessing, via a preprocessing module, a video stream at a requested video data rate parameter according to one example implementation of the present disclosure.

As schematically illustrated in FIG. 1, to address the issues identified above, a computing system 100 for preprocessing, via a preprocessing module 24, a video stream at a requested video data rate parameter 20 is provided. As illustrated in FIG. 1, the computing system 100 communicates with a server 16 that is connected to a plurality of remote client devices 18 via a computer network, such as the Internet, where a joint video communication session is hosted on a video conferencing platform implemented at least in part by the server 16. The joint video communication session is an online meeting or video conferencing between two or more participants communicating in real time over an internet connection. During the session, participants can see and hear each other in real time and share screens, documents, and presentations with each other. The server 16 comprises a processor 26 coupled to a memory that stores instructions, which, upon execution by the processor 26, cause the processor 26 to communicate with the plurality of remote client devices 18 to establish the joint video communication session with the computing system 100 and the plurality of remote client devices 18. The server 16 may be one of a plurality of server devices in a data center, and the processor 26 may be one processor of a single server device or multiple processors of multiple server devices. The plurality of remote client devices 18 may be of any suitable type such as a smartphone, tablet, personal computer, laptop, wearable electronic device, etc. Each of the plurality of remote client devices 18 receives video data at a requested download video data rate parameter 19 from the computing system 100 via the server 16. The requested download video data rate parameter 19 may include bits-per-second, resolution, color depth, and/or frame rate. For instance, the requested download data rate parameter 19 requested by a desktop or laptop computer may be a HD or Full HD resolution, while the requested download data rate parameter 19 requested by a smartphone or tablet may be a thumbnail or SD resolution. The server 16 receives information on the requested download video data rate parameters 19 from the plurality of remote client devices 18 and computes a requested video data rate parameter 20 which is equal to the highest of the plurality of requested download video data rate parameters 19. The requested video data rate parameter 20 may include bits-per-second, resolution, color depth, and/or frame rate, depending on the parameters requested by the plurality of remote client devices 18. For example, when the plurality of remote client devices 18 request specific resolutions, the requested video data rate parameter 20 includes a requested resolution, and the requested resolution is the highest of one or more client-requested resolutions respectively requested by the one or more remote client devices 18. When the remote client devices 18 request a thumbnail resolution, SD resolution, and HD resolution respectively, the server 16 computes the highest of the requested resolution which is HD resolution. Upon obtaining the requested video data rate parameter 20, the server 16 sends the computed requested video data rate parameter 20 to the computing system 100 which is a target client device 11 outputting video stream to other remote client devices. It will be appreciated that each of the one or more remote client devices 18 can be the target client device 11 such that the video stream is transferred in multiple streams. For example, when there are four remote client devices 18 in a joint video session, each of the four remote client devices 18 has the camera 30 on and sends one or multiple video stream(s) to the server 16. In this example, the server 16 relays the video streams so that each of the remote client devices 18 receives three video streams from other remote client devices 18, and the server 16 sends the computed requested video data parameter 20 to each of the remote client devices 18, each of which is also a target client device 11 that receives video streams from the server 16.

As illustrated in FIG. 1, the computing system 100, which receives the requested video data rate parameter 20 from the server 16, comprises a camera 30, an image processing pipeline 22, and processing circuitry 12 coupled to a memory 14 that stores instructions. The computing system 100 may include a client computing device which may be of any suitable type such as a smartphone, tablet, personal computer, laptop, wearable electronic device, etc. The camera 30 may be a built-in camera of a client computing device or a peripheral webcam connected to the client computing device. The camera 30, which includes a sensor 32 and a CPU (camera-integrated image processor) 34, is configured to capture a series of images in a video stream. It will be appreciated that the sensor 32 can be multiple sensors such as front and back sensors. The image processing pipeline 22 is controlled by an image signal processing control 28 (e.g., 3A) which includes auto-exposure (AE), auto-white balance (AWB), and auto-focus (AF) algorithm/functionalities. The AE is responsible for automatically adjusting the exposure settings of the camera or image sensor to ensure optimal brightness in the captured image or video. The AE algorithms analyze the lighting conditions and adjust parameters such as shutter speed, aperture, and ISO sensitivity to achieve a well-exposed image. The AWB is used to correct color casts caused by different lighting conditions to ensure that the colors in the image or video appear natural and consistent. The AWB algorithms analyze the scene's color temperature and adjust the color balance to remove unwanted color tints and maintain accurate color representation. The image processing pipeline 22 includes the preprocessing module 24 and an encoder 120, in which the preprocessing module 24 is configured to receive the video stream from the camera 30 at a camera-native video data rate parameter and the encoder 120 is configured to encode the video stream into one of a plurality of formats, as discussed below. The AF is used to achieve sharp and clear focus in images and videos. It involves adjusting the lens position or focus settings to bring the subject into focus. The AF algorithms analyze image sharpness or contrast information and continuously adjust the focus until the desired level of sharpness is achieved. The processing circuitry 12 includes a CPU that may be implemented in a System on Chip (SoC). The preprocessing module 24 includes sensor frontend logic that may be implemented in the SoC, in which the sensor frontend logic is configured to perform preprocessing on the video stream from the camera 30. The preprocessing module 24 further includes the camera-integrated image processor (CPU) 34 configured to perform preprocessing on the video stream and other units for preprocessing, as discussed below. The system on a chip (SoC) is an integrated circuit that integrates most or all components of a computer or other electronic system, including a central processing unit (CPU), memory interfaces, on-chip input/output devices, input/output interfaces, and secondary storage interfaces.

Continuing with FIG. 1, the instructions of the memory 14 which, upon execution by the processing circuitry 12, cause the processing circuitry 12 to communicate with the server 16 to establish the joint video communication session with the one or more remote client devices 18 and receive the requested video data rate parameter 20 from the server 16 for the video stream captured by the camera 30, as discussed above. The processing circuitry 12 is further configured to send a command to the preprocessing module 24 to adjust the camera-native video data rate parameter of the video stream captured by the camera 30 to the requested video data rate parameter 20 and preprocess the video stream at the requested video data rate parameter 20. In the depicted example, the preprocessing module 24 includes the CPU (camera-integrated image processor) 34 of the camera 30, D/C PHY 36, a frontend processing 40, a Raw/Bayer processing 52, RGB processing 72, YUV processing 90, and export and scaling processing 108. It will be appreciated that some of the units in the depicted example of the preprocessing module 24 may be omitted or additional processing units may be added. The processing circuitry 12 sends the command to the CPU (camera-integrated image processor) 34 of the camera 30, the frontend processing 40, and/or Raw/Bayer processing 52 of the preprocessing module 24 to adjust the camera-native video data rate parameter of the video to the requested video data rate parameter 20. The function of each unit included in the preprocessing module 24 is as follows.

The D/C PHY 36 is a Mobile Industry Processor Interface (MIPI) physical layer that connects megapixel cameras and high-resolution displays to an application processor. The frontend processing 40 includes re-mosaic 42, binning 44, sensor swap 46, and defect pixel correction 48. The re-mosaic 42 converts a pixel array of an input image to a different pixel array. The binning 44 combines clusters of adjacent pixels, throughout an image, into single pixels. The sensor swap 46 swaps data from two sensors in an image. The defect pixel correction 48 corrects pixels that are defective or have errors.

DDR 50 is an image processing memory, which is a double data rate (DDR) system memory. The DDR 50 may be accessed by each module of the preprocessing module 24 including the sensor frontend logic of the preprocessing module to read and write for performing the preprocessing, in which the video stream at the requested video data rate parameter 20 is written to the DDR 50 (image processing memory) by the sensor frontend logic during processing of the video stream by the preprocessing module 24.

The Raw/Bayer processing 52 is an image processing method, including auto white balance 54, defect pixel correction 56, black level correction 58, noise reduction 60, lens shading correction 62, and demosaic 64. The auto white balance 54 automatically adjusts the color temperature of images based on an ambient light. The defect pixel correction 56 corrects pixels that are defective or have errors. The black level correction 58 adjusts the black level of the images. The noise reduction 60 removes noise from the images. The lens shading correction 62 corrects for the non-uniformity of illumination across the images caused by the lens. The demosaic 64 reconstructs a full color image based on a Raw/Bayer image.

The RGB processing 72 is a process of combining two or more images into one composite image, which includes distortion correction 76, auto-frame 78, noise reduction 80, and temporal noise reduction 82, and HDR 84. The distortion correction 76 removes or minimizes the distortion in an image caused by the lens. The auto-frame 78 automatically adjusts the frame to keep a person in view. The noise reduction 80 and temporal noise reduction 82 removes noise from the images. The HDR 84 uses a high dynamic range (HDR) technique to reproduce a greater dynamic range of luminosity.

The YUV processing 90 includes color correction matrix 92, tone curve adjustment 94, noise reduction 96, and edge enhancement 98. The color correction matrix 92 corrects for color errors in an image by performing matrix multiplication of a single RGB tuple with a color correction matrix. The tone curve adjustment 94 adjusts the brightness and contrast of the whole image. The noise reduction 96 removes noise from the images, and the edge enhancement 98 sharpens the edges of an image.

The export and scaling processing 108 includes scale and crop processing 110, sharpening 112, and color space conversion 114. The scale and crop processing 110 resizes the image and removes part of the image and focuses on a smaller section. Sharpening 112 enhances the edges, details, and contrast of an image, and the color space conversion 114 changes the color representation of an image from one color space to another.

As described above, at an early stage of the preprocessing module 24 (the camera 30, the frontend processing 40, or the Raw/Bayer processing 52), the camera-native video data rate parameter of the video stream is adjusted to the requested video data rate parameter 20. This adjustment allows the video stream to be processed via a majority of the preprocessing module 24 at the requested video data rate parameter 20, which is lower than the camera-native video data rate parameter. In particular, binning 44, auto white balance 54, noise reduction 60, and demosaic 64 benefit from having less data (e.g., pixels) to process by processing the video stream at the requested video data rate parameter 20. For instance, when the camera-native video data rate parameter is a resolution of 1920×1080 (Full HD) and the requested video data rate parameter is 1280×720 (HD), the resolution of the video stream is adjusted to 1280×720 (HD) from 1920×1080 (Full HD) via one of the camera 30, the frontend processing 40, and the Raw/Bayer processing 52 of the preprocessing module 24. As a result, the rest of the preprocessing module 24 processes the video stream at the 1280×720 (HD) resolution.

After preprocessing, the preprocessing module is configured to pass the processed video stream to the encoder 120. The encoder 120 is configured to encode the processed video stream into a specified format, maintaining the requested video data rate parameter 20. The processing circuitry 12 is configured to transmit the video stream, in the specified format, at the requested video data rate parameter 20 to the server 16. The server 16 then converts the video stream format to an appropriate format for each of the remote client devices 18 based on the requested download video rate parameter 19 and send it to each of the remote client devices 18. For example, when the requested download data rate parameter 19 includes SD, HD, and Full HD resolutions, the server 16 receives the video stream at a Full HD resolution from the computing system 100 and prepares the video stream at SD, HD, and Full HD resolutions. It will be appreciated that the encoder 120 of the computing system 100 may convert the video stream format to an appropriate format for each of the remote client devices 18 based on the requested download video rate parameter 19 and send them to the server 16.

Figure 2:
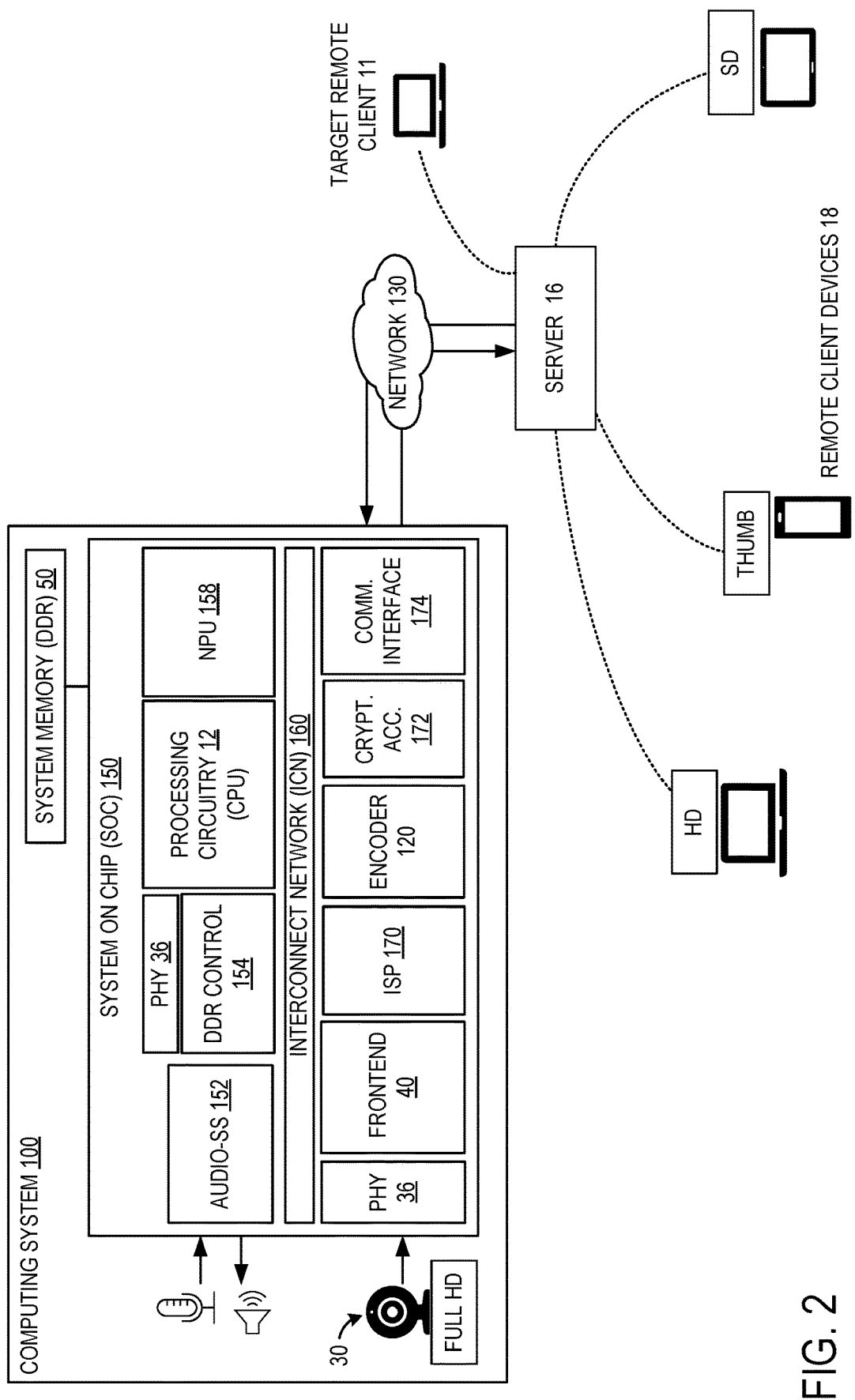
FIG. 2 shows a schematic view of an example system on chip (SoC) implemented in the computing system of FIG. 1.

FIG. 2 shows a schematic view of an example system on chip (SoC) 150 implemented in the computing system 100 of FIG. 1. In the depicted example, audio-SS 152, PHY 36, a DDR control 154, the processing circuitry 12 including a CPU, neural processing unit (NPU) 158, the frontend processing 40, an image signal processor (ISP) 170 (which is part of the preprocessing module 24 of FIG. 1), the encoder 120, cryptographic account 172, and communication interface 174 are implemented in the SoC 150. The SoC 150 further includes an interconnect network (ICN) 160 that connects different processing units in the SoC 150. The communication interface 174 is configured to communicate with the server 16 via a network 130.

FIG. 3 shows data rates required for processing various formats with different resolutions by the computing system 100 of FIG. 1. The Table of FIG. 3 shows the formats including Ultra HD, Quad HD, Full HD, HD, and SD, minimum frame rate for each format, color space for each format, data rate for each format, and data rate ratio compared with Ultra HD. The color space is a specific organization of colors that allows for the representation of colors in a way that is both reproducible and consistent across different devices and media. Some of the most common color spaces include RGB (Red, Green, Blue), CMYK (Cyan, Magenta, Yellow, Black), and YUV (Luminance, Chrominance), and NV12 in the Table indicates a YUV 4:2:0 format. As shown at the Table, the data rate for each format is as follows: 2985.984 megabits/sec for Ultra HD; 1327.104 megabits/sec for Quad HD; 746.496 megabits/sec for Full HD; 331.776 megabits/sec for HD; and 82.994 megabits/sec for SD. For instance, there is a 9× difference between Ultra HD and HD for data rates (2985.94/331.776). This indicates that there would be a 9× difference in the amount of pixels to preprocess via the preprocessing module 24 of the system 100 of FIG. 1 when the camera-native video data rate parameter is Ultra HD and the requested video data rate parameter 20 is HD (when the highest resolution requested by the plurality of remote client devices is HD). Thus, by preprocessing the video stream at the requested video data rate parameter 20, which is lower than the camera-native video data rate parameter, via the preprocessing module 24, organizations can save a considerable amount of power consumption and processing and memory needs.

Figure 4:
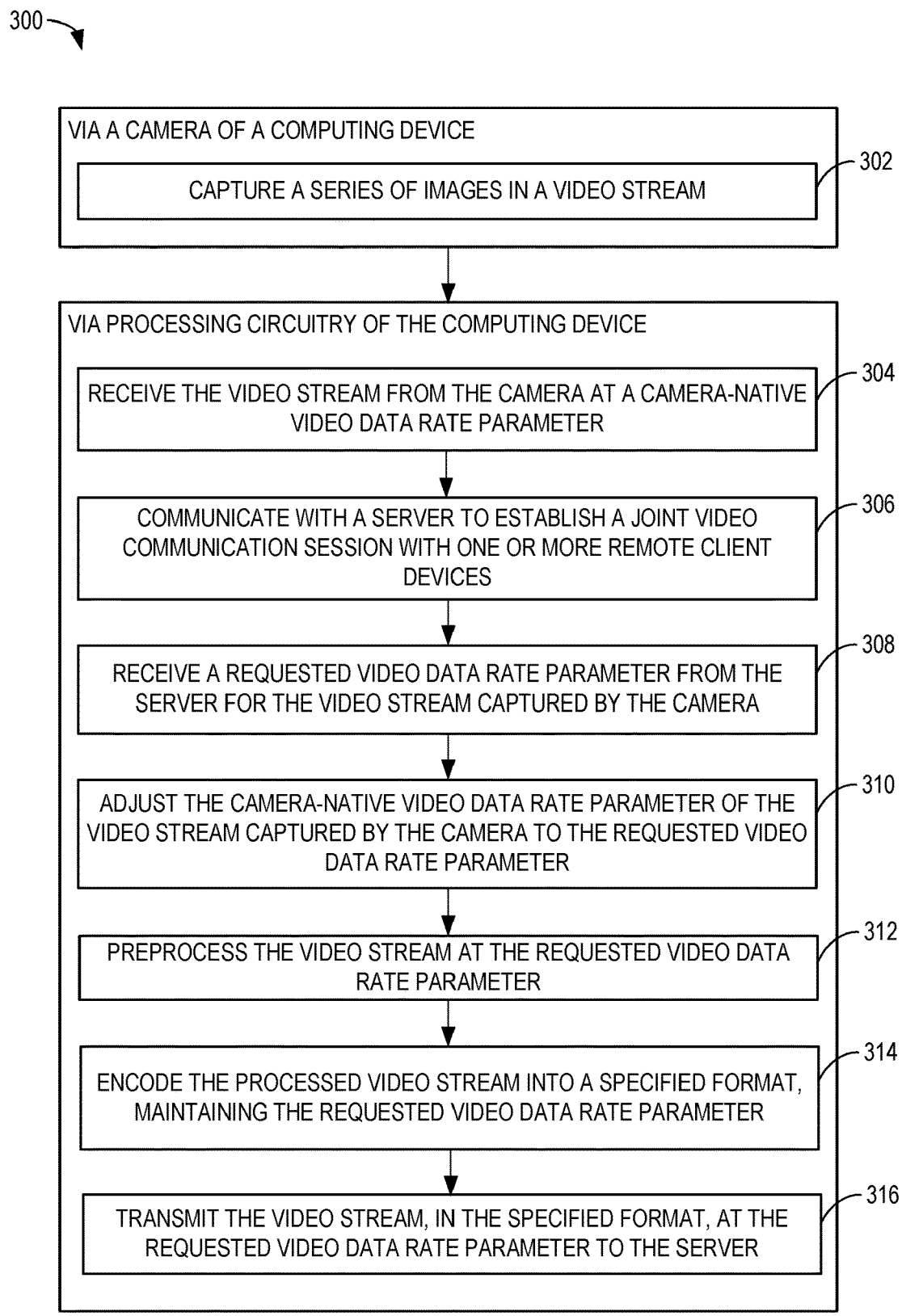
FIG. 4 is a flowchart of a method for use with a computing device having a camera and associated processing circuitry according to one example configuration of the present disclosure.

FIG. 4 is a flowchart of a computerized method 300 for use with a computing device having a camera and associated processing circuitry. At step 302, the method 300 may include, via the camera, capturing a series of images in a video stream.

At steps 304 to 316 below, each step is performed via the processing circuitry. At step 304, the method 300 may include receiving the video stream from the camera at a camera-native video data rate parameter.

Advancing from step 304 to step 306, the method 300 may include communicating with a server to establish a joint video communication session with one or more remote client devices.

Proceeding from step 306 to step 308, the method 300 may include receiving a requested video data rate parameter from the server for the video stream captured by the camera.

Continuing from step 308 to step 310, the method 300 may include adjusting the camera-native video data rate parameter of the video stream captured by the camera to the requested video data rate parameter.

At step 312, the method 300 may further include preprocessing the video stream at the requested video data rate parameter.

Advancing from step 312 to step 314, the method 300 may include encoding the processed video stream into a specified format, maintaining the requested video data rate parameter.

Proceeding from step 314 to step 316, the method 300 may include transmitting the video stream, in the specified format, at the requested video data rate parameter to the server.

The computing system 100 and method 300 described herein provide mechanisms for preprocessing the video stream at the requested video data rate parameter before passing the video stream to the encoder is provided. These systems and methods can be used to aid video conferencing. By preprocessing the video stream at a requested video data rate parameter which is lower than a camera-native video data parameter, an organization can save a considerable amount of power consumption and processing and memory needs.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
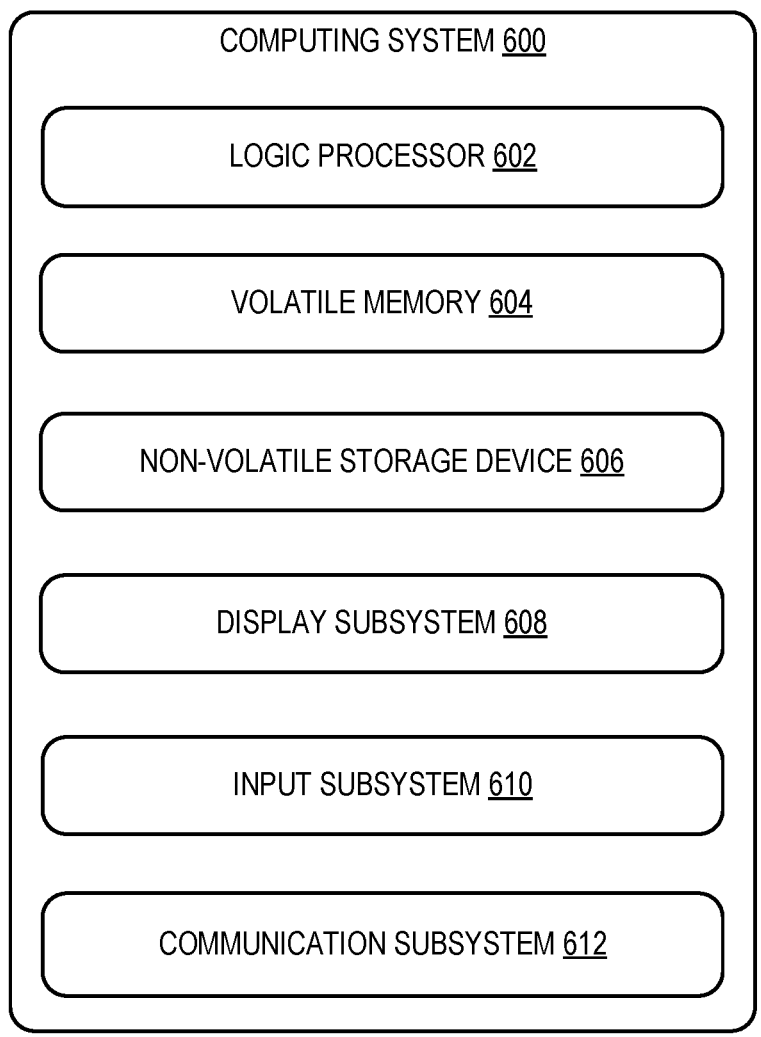
FIG. 5 is a schematic view of an example computing system according to one implementation of the present disclosure.

FIG. 5 schematically shows a non-limiting embodiment of a computing system 600 that can enact one or more of the methods and processes described above. Computing system 600 is shown in simplified form. Computing system 600 may embody the computing system 100 described above and illustrated in FIG. 1. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 5.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs provide additional support for the claims of the subject application. One aspect provides a computing system for preprocessing a video stream at a requested video data rate parameter. According to this aspect, the computing system may include a camera configured to capture a series of images in a video stream. The computing system may further include an image processing pipeline including a preprocessing module and an encoder, in which the preprocessing module is configured to receive the video stream from the camera at a camera-native video data rate parameter, and the encoder is configured to encode the video stream into one of a plurality of formats. The computing system may further include processing circuitry coupled to a memory that stores instructions, which, upon execution by the processing circuitry, cause the processing circuitry to communicate with a server to establish a joint video communication session with one or more remote client devices. The processing circuitry may be further configured to receive a requested video data rate parameter from the server for the video stream captured by the camera. The processing circuitry may be further configured to send a command to the preprocessing module to adjust the camera-native video data rate parameter of the video stream captured by the camera to the requested video data rate parameter. The preprocessing module may be configured to preprocess the video stream at the requested video data rate parameter and pass the processed video stream to the encoder. The encoder may be configured to encode the preprocessed video stream into a specified format, maintaining the requested video data rate parameter. The processing circuitry may be further configured to transmit the video stream, in the specified format, at the requested video data rate parameter to the server.

According to this aspect, the requested video data rate parameter may be selected from the group consisting of bits-per-second, resolution, color depth, and/or frame rate.

According to this aspect, the preprocessing module may include a camera-integrated image processor configured to perform preprocessing on the video stream.

According to this aspect, the processing circuitry may include a CPU implemented in a System on Chip (SoC), and the preprocessing module may include sensor frontend logic configured to perform preprocessing on the video stream from the camera, the sensor frontend logic being implemented in the SoC.

According to this aspect, the computing system may further include an image processing memory accessible by the sensor frontend logic of the preprocessing module, in which the video stream at the requested video data rate parameter may be written to the image processing memory by the sensor frontend logic during processing of the video stream by the preprocessing module.

According to this aspect, the requested video data rate parameter may include a requested resolution, and the requested resolution may be a highest of one or more client-requested resolutions respectively requested by the one or more remote client devices.

According to this aspect, the camera-native video data rate parameter may include a resolution of 1920×1080 (Full HD) or higher, and the requested video data rate parameter is lower than the camera-native video data rate parameter.

According to this aspect, the camera may be a built-in camera of a client computing device or a peripheral webcam connected to the client computing device.

According to this aspect, the joint video communication session may be hosted on a video conferencing platform implemented at least in part by the server.

According to another aspect of the present disclosure, a computerized method for use with a computing device having a camera and associated processing circuitry is provided. According to this aspect, the computerized method may include, via the camera, capturing a series of images in a video stream. The computerized method may further include, via the processing circuitry, receiving the video stream from the camera at a camera-native video data rate parameter. The computerized method may further include, via the processing circuitry, communicating with a server to establish a joint video communication session with one or more remote client devices. The computerized method may further include, via the processing circuitry, receiving a requested video data rate parameter from the server for the video stream captured by the camera. The computerized method may further include, via the processing circuitry, adjusting the camera-native video data rate parameter of the video stream captured by the camera to the requested video data rate parameter. The computerized method may further include, via the processing circuitry, preprocessing the video stream at the requested video data rate parameter. The computerized method may further include, via the processing circuitry, encoding the preprocessed video stream into a specified format, maintaining the requested video data rate parameter. The computerized method may further include, via the processing circuitry, transmitting the video stream, in the specified format, at the requested video data rate parameter to the server.

According to this aspect, the requested video data rate parameter may be selected from the group consisting of bits-per-second, resolution, color depth, and/or frame rate.

According to this aspect, the processing circuitry may include a CPU implemented in a System on Chip (SoC) of a computing device, and preprocessing on the video stream at the requested video data rate parameter may be performed via sensor frontend logic that is implemented in the SoC.

According to this aspect, the video stream at the requested video data rate parameter may be written to image processing memory by the sensor frontend logic during preprocessing of the video stream.

According to this aspect, the requested video data rate parameter may include a requested resolution, and the requested resolution may be a highest of one or more client-requested resolutions respectively requested by the one or more remote client devices.

According to this aspect, the camera-native video data rate parameter may include a resolution of 1920×1080 (Full HD) or higher, and the requested video data rate parameter is lower than the camera-native video data rate parameter.

According to this aspect, the camera may be a built-in camera of a client computing device or a peripheral webcam connected to the client computing device According to this aspect, the joint video communication session may be hosted on a video conferencing platform implemented at least in part by the server.

According to another aspect of the present disclosure, a server computing device for establishing a joint video communication session with one or more remote client devices is provided. The server computing device may include a processor coupled to a memory that stores instructions, which, upon execution by the processor, cause the processor to communicate with a plurality of remote client devices to establish a joint video communication session with the plurality of remote client devices. The processor may be further configured to receive a plurality of requested download resolutions from the plurality of remote client devices. The processor may be further configured to compute a requested upload resolution to be equal to a highest of the plurality of requested download resolutions. The processor may be further configured to send the requested upload resolution to a target remote client device. The processor may be further configured to receive a video stream at the requested upload resolution from the target remote client device.

According to this aspect, the processor may be further configured to receive a plurality of requested download color depths or frame rates from the plurality of remote client devices. The processor may be further configured to compute a requested upload color depth or frame rate to be equal to a highest of the plurality of requested download color depths or frame rates. The processor may be further configured to send the requested upload color depth or frame rate to a target remote client device. The processor may be further configured to receive a video stream at the requested color depth or frame rate from the target remote client device.

According to this aspect, the joint video communication session may be hosted on a video conferencing platform implemented at least in part by the server computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
   a camera configured to capture a series of images in a video stream;
   an image processing pipeline including a preprocessing module and an encoder, the preprocessing module being configured to receive the video stream from the camera at a camera-native video data rate parameter, the encoder being configured to encode the video stream into one of a plurality of formats; and
   processing circuitry coupled to a memory that stores instructions, which, upon execution by the processing circuitry, cause the processing circuitry to:
   communicate with a server to establish a joint video communication session with one or more remote client devices;
   receive a requested video data rate parameter from the server for the video stream captured by the camera; and
   send a command to the preprocessing module to adjust the camera-native video data rate parameter of the video stream captured by the camera to the requested video data rate parameter, wherein
   the preprocessing module is configured to preprocess the video stream at the requested video data rate parameter and pass the processed video stream to the encoder,
   the encoder is configured to encode the preprocessed video stream into a specified format, maintaining the requested video data rate parameter, and
   the processing circuitry is configured to transmit the video stream, in the specified format, at the requested video data rate parameter to the server.

2. The computing system of claim 1, wherein the requested video data rate parameter is selected from the group consisting of bits-per-second, resolution, color depth, and/or frame rate.

3. The computing system of claim 1, wherein the preprocessing module includes a camera-integrated image processor configured to perform preprocessing on the video stream.

4. The computing system of claim 1, wherein the processing circuitry includes a CPU implemented in a System on Chip (SoC), and the preprocessing module includes sensor frontend logic configured to perform preprocessing on the video stream from the camera, the sensor frontend logic being implemented in the SoC.

5. The computing system of claim 4, further comprising an image processing memory accessible by the sensor frontend logic of the preprocessing module, wherein the video stream at the requested video data rate parameter is written to the image processing memory by the sensor frontend logic during processing of the video stream by the preprocessing module.

6. The computing system of claim 1, wherein the requested video data rate parameter includes a requested resolution, and the requested resolution is a highest of one or more client-requested resolutions respectively requested by the one or more remote client devices.

7. The computing system of claim 1, wherein the camera-native video data rate parameter includes a resolution of 1920×1080 (Full HD) or higher, and the requested video data rate parameter is lower than the camera-native video data rate parameter.

8. The computing system of claim 1, wherein the camera is a built-in camera of a client computing device or a peripheral webcam connected to the client computing device.

9. The computing system of claim 1, wherein the joint video communication session is hosted on a video conferencing platform implemented at least in part by the server.

10. A computerized method for use with a computing device having a camera and associated processing circuitry, the method comprising:
via the camera:
capturing a series of images in a video stream;
via the processing circuitry:
receiving the video stream from the camera at a camera-native video data rate parameter;
communicating with a server to establish a joint video communication session with one or more remote client devices;
receiving a requested video data rate parameter from the server for the video stream captured by the camera;
adjusting the camera-native video data rate parameter of the video stream captured by the camera to the requested video data rate parameter;
preprocessing the video stream at the requested video data rate parameter;
encoding the preprocessed video stream into a specified format, maintaining the requested video data rate parameter; and
transmitting the video stream, in the specified format, at the requested video data rate parameter to the server.

11. The method of claim 10, wherein the requested video data rate parameter is selected from the group consisting of bits-per-second, resolution, color depth, and/or frame rate.

12. The method of claim 10, wherein the processing circuitry includes a CPU implemented in a System on Chip (SoC) of a computing device, and preprocessing on the video stream at the requested video data rate parameter is performed via sensor frontend logic that is implemented in the SoC.

13. The method of claim 12, wherein the video stream at the requested video data rate parameter is written to image processing memory by the sensor frontend logic during preprocessing of the video stream.

14. The method of claim 10, wherein the requested video data rate parameter includes a requested resolution, and the requested resolution is a highest of one or more client-requested resolutions respectively requested by the one or more remote client devices.

15. The method of claim 10, wherein the camera-native video data rate parameter includes a resolution of 1920×1080 (Full HD) or higher, and the requested video data rate parameter is lower than the camera-native video data rate parameter.

16. The method of claim 10, wherein the camera is a built-in camera of a client computing device or a peripheral webcam connected to the client computing device.

17. The method of claim 10, wherein the joint video communication session is hosted on a video conferencing platform implemented at least in part by the server.

18. A server computing device for establishing a joint video communication session with one or more remote client devices, the server computing device comprising:
a processor coupled to a memory that stores instructions, which, upon execution by the processor, cause the processor to:
communicate with a plurality of remote client devices to establish a joint video communication session with the plurality of remote client devices;
receive a plurality of requested download resolutions from the plurality of remote client devices;
compute a requested upload resolution to be equal to a highest of the plurality of requested download resolutions;
send the requested upload resolution to a target remote client device; and
receive a video stream at the requested upload resolution from the target remote client device.

19. The server computing device of claim 18, wherein the processor is further configured to:
receive a plurality of requested download color depths or frame rates from the plurality of remote client devices;
compute a requested upload color depth or frame rate to be equal to a highest of the plurality of requested download color depths or frame rates;
send the requested upload color depth or frame rate to a target remote client device; and
receive a video stream at the requested color depth or frame rate from the target remote client device.

20. The server computing device of claim 18, wherein the joint video communication session is hosted on a video conferencing platform implemented at least in part by the server computing device.

* * * * *